United States Patent
Mazeris (10) Patent No.: US 9,888,669 B2
(45) Date of Patent: Feb. 13, 2018

(54) SYSTEM AND METHOD FOR GROOMING-RELATED FARM DECISION SUPPORT

(71) Applicant: DELAVAL HOLDING AB, Tumba (SE)

(72) Inventor: Fernando Mazeris, Stockholm (SE)

(73) Assignee: DELAVAL HOLDING AB, Tumba (SE)

( * ) Notice: Subject to any disclaimer, the term of this patent is extended or adjusted under 35 U.S.C. 154(b) by 597 days.

(21) Appl. No.: 14/379,341

(22) PCT Filed: Mar. 15, 2013

(86) PCT No.: PCT/SE2013/050259
§ 371 (c)(1),
(2) Date: Aug. 18, 2014

(87) PCT Pub. No.: WO2013/147678
PCT Pub. Date: Oct. 3, 2013

(65) Prior Publication Data
US 2015/0020747 A1  Jan. 22, 2015

Related U.S. Application Data

(60) Provisional application No. 61/616,503, filed on Mar. 28, 2012.

(30) Foreign Application Priority Data

Mar. 28, 2012 (SE) ...................... 1250306

(51) Int. Cl.
*A01K 13/00* (2006.01)
*A01K 29/00* (2006.01)
*G07C 1/10* (2006.01)

(52) U.S. Cl.
CPC .......... *A01K 13/002* (2013.01); *A01K 13/004* (2013.01); *A01K 29/005* (2013.01); *G07C 1/10* (2013.01)

(58) Field of Classification Search
CPC .... A01K 13/00; A01K 13/002; A01K 13/003; A01K 13/004; A01K 29/005
See application file for complete search history.

(56) References Cited

U.S. PATENT DOCUMENTS 3,175,537 A * 3/1965 Paul ..................... A01K 13/004
119/656
4,129,855 A * 12/1978 Rodrian ............... A01K 11/006
119/51.02

(Continued)

FOREIGN PATENT DOCUMENTS

EP  0 624 313 A1  11/1994
EP  1 487 258 B1  6/2005

(Continued)

OTHER PUBLICATIONS

Val-Laillet et al.; Short Communication: Dominance in Free-Stall-Housed Dairy Cattle Is Dependent upon Resource; 2008; American Dairy Science Association; J. Dairy Sci. 91:3922-3926.*

(Continued)

*Primary Examiner* — Monica L Williams
*Assistant Examiner* — Michael A. Fabula
(74) *Attorney, Agent, or Firm* — Young & Thompson (57) ABSTRACT

A method and system providing farm decision support relating to individual animals in a herd in a farm environment includes a brush station having a reader configured to remotely register, via identification devices, an identity of each animal visiting the brush station responsive to a detection unit detecting a repositioning of the brush from a neutral position resulting from an animal pushing against the brush. The reader unit has a detection range within which identity (Continued)

data can be read out from the identification device of each animal. In response to a detected repositioning of the brush, the reader unit registers the identity data from a first detected identification device within the detection range, and forwards the identity data to a processing unit via an output interface. The processing unit stores registered data representing animal visits to the brush station as decision support data.

15 Claims, 3 Drawing Sheets

(56) References Cited

U.S. PATENT DOCUMENTS

| | | | | |
|---|---|---|---|---|
| 4,463,353 | A * | 7/1984 | Kuzara | A01J 5/0131 119/51.02 |
| 4,475,481 | A * | 10/1984 | Carroll | A01K 11/006 119/51.02 |
| 4,532,892 | A * | 8/1985 | Kuzara | A01J 5/0131 119/51.02 |
| 5,950,562 | A * | 9/1999 | Schulte | A01K 1/0023 119/51.02 |
| 5,970,911 | A * | 10/1999 | van der Lely | A01J 5/0175 119/14.02 |
| 6,318,298 | B1 * | 11/2001 | Nonay | A01K 13/004 119/14.18 |
| 6,553,942 | B1 * | 4/2003 | Eriksson | A01J 7/04 119/14.18 |
| 6,569,092 | B1 * | 5/2003 | Guichon | A01K 11/008 119/455 |
| 7,481,184 | B2 * | 1/2009 | van ver Poel | A01K 13/004 119/621 |
| 7,765,016 | B2 * | 7/2010 | Pillon | B60S 3/06 15/53.1 |
| 2003/0209209 | A1 * | 11/2003 | Udelle | A01K 13/004 119/609 |
| 2004/0237232 | A1 * | 12/2004 | Ennis | B60S 3/063 15/53.2 |
| 2005/0076839 | A1 * | 4/2005 | Van Den Berg | A01J 5/017 119/14.04 |
| 2005/0076840 | A1 * | 4/2005 | Van Den Berg | A01J 5/017 119/14.04 |
| 2005/0115506 | A1 * | 6/2005 | Van Den Berg | A01J 5/017 119/14.03 |
| 2005/0120965 | A1 * | 6/2005 | Van Den Berg | A01J 5/017 119/14.02 |
| 2005/0161003 | A1 * | 7/2005 | van der Poel | A01K 13/004 119/608 |
| 2005/0223997 | A1 * | 10/2005 | Umegard | A01K 1/12 119/14.03 |
| 2007/0000450 | A1 * | 1/2007 | Otten | A01K 13/004 119/609 |
| 2009/0078215 | A1 * | 3/2009 | Lash | A01K 29/005 119/712 |
| 2010/0107985 | A1 * | 5/2010 | O'Hare | A01K 29/005 119/174 |
| 2011/0000438 | A1 * | 1/2011 | Van Der Poel | A01K 13/004 119/609 |
| 2011/0174234 | A1 * | 7/2011 | Friberg | A01K 13/004 119/609 |
| 2011/0298619 | A1 * | 12/2011 | O'Hare | A01K 11/008 340/573.1 |
| 2013/0125828 | A1 * | 5/2013 | Van Der Poel | A01K 13/00 119/609 |
| 2014/0090607 | A1 * | 4/2014 | Dole | A01K 13/004 119/609 |

FOREIGN PATENT DOCUMENTS

| | | |
|---|---|---|
| RU | 37 591 U1 | 5/2004 |
| RU | 2395082 C1 | 7/2010 |
| SU | 112175 A1 | 11/1957 |
| SU | 1625459 A1 | 2/1991 |
| WO | 96/19917 A2 | 7/1996 |
| WO | 97/43897 A1 | 11/1997 |
| WO | 2009/110828 A1 | 9/2009 |
| WO | 2009/131439 A1 | 10/2009 |

OTHER PUBLICATIONS

DeVries et al.; Short Communication: Usage of Mechanical Brushes by Lactating Dairy Cows; 2007; American Dairy Science Association; J. Dairy Sci. 90:2241-2245.*

International-Type Search Report, dated Sep. 27, 2012, from corresponding PCT application.

International Search Report, dated Jun. 24, 2013, from corresponding PCT application.

Supplementary International Search Report, dated Jul. 4, 2014, from corresponding PCT application.

Ynte H. Schukken et al., "Cow comfort effects of milk production and mastitis: a field study", Apr. 18, 2009, retrieved from Internet: http://www.milkproduction.com/Library/Scientific-articles/Housing/Cow-comfort-effects-on-milk/.

* cited by examiner

SYSTEM AND METHOD FOR GROOMING-RELATED FARM DECISION SUPPORT

THE BACKGROUND OF THE INVENTION AND PRIOR ART

The present invention relates generally to decision support in respect of the animals in a herd located in a farm environment. More particularly, the invention relates to an automatic animal grooming method and system as disclosed below. The invention also relates to a computer program 7 and a computer readable medium.

Modern milk production units are normally highly efficient in terms of extracted milk volume per animal. One important factor behind this is good animal health and hygiene. An automatic brush that for example can be visited on the animals' own initiative constitutes one tool to attain improved animal health and hygiene. EP 1 487 258 describes such a brush, which has an oblong, vertical brush element being rotatable and flexible to provide efficient and comfortable grooming.

The article Schukken, Y. H., et al., "Field Study on Milk Production and Mastitis Effect of the DeLaval Swinging Cow Brush", Final Report, Aug. 5, 2009, www.milkproduction.com shows that there may be a slight increase in the milk production in response to the installation of a cow brush in a pen. It is statistically proven that clinical mastitis is lower in pens of cows in second and higher lactation with a cow brush than in corresponding pens without a cow brush.

PROBLEMS ASSOCIATED WITH THE PRIOR ART

Hence, it is clear that automatic brushes are beneficial to the health of milk producing animals. Nevertheless, there is yet no technical solution that, based on the animals' interaction with such brushes, provides further beneficial results that are useful to a farmer in his/her work with a herd of milk-producing animals.

SUMMARY OF THE INVENTION

The object of the present invention is to solve the above problem, and offer decision support to a farmer in respect of a herd of animals utilizing a brush station.

According to one aspect of the invention, the object is achieved by the initially described system, wherein the brush station includes a brush, a reader unit and an output interface. The brush is associated with a detection means configured to detect a repositioning of the brush from a neutral position resulting from an animal pushing a part of itself against the brush. The reader unit has a detection range within which identity data can be read out from an identification device. In response to a detected repositioning of the brush, the brush station is configured to register the identity data from a first detected identification device within the detection range, and forward the identity data to the processing unit via the output interface. The processing unit, in turn, is configured to register data representing animal visits to the brush station.

This system is advantageous because the registered visits to the brush station provides the farmer with a basis for identifying any specific animals which needs to be studied further, for instance to detect possible health issues. However, the system also facilitates herd-level decision making, such as relating to the appropriate number of and/or locations for the brush stations. Moreover, the farmer is aided in decisions concerning environmental factors like when to clean the pen, whether the ventilation thereof is adequate and/or if the temperature level is suitable.

According to an embodiment of this aspect of the invention, the brush is pivotably attached to a base structure so as to permit a swivelling motion of the brush relative to the base structure in response to push forces exerted on the brush. Hence, the brush reaches large areas of the animal in a very convenient manner.

According to another embodiment of this aspect of the invention, the brush station also includes a motor configured to rotate the brush around an axis. The motor is here activated in response to the detected repositioning of the brush, i.e. when an animal arrives at the brush station and expresses a desire to be brushed, for example by rubbing itself against the brush so that the brush is tilted, rotated and/or by other means moved from its neutral position. Thus, the grooming becomes more efficient. Preferably, the motor remains activated until the animal associated with the activation has removed itself from the brush station, for example when the brush returns to the neutral position. This point in time preferably also defines the end of the animal's visit to the brush station for the registration purposes of the processing unit.

According to yet another preferred embodiment of this aspect of the invention, the registered data includes start and stop times for each animal identity having visited the brush station in the period during which the data is registered. Based thereon, a wide variety of processed data can be derived, which are useful as decision support. Here, the detection means is further configured to detect a return of the brush to the neutral position. Thus, each of said stop times is registered when the detection means detects that the brush returns to the neutral position.

According to still another preferred embodiment of this aspect of the invention, the processing unit is further configured to; based on the reference data, derive: a duration for each animal's visit to a brush station; a time of the day for each animal's visit to a brush station; and/or a frequency with which each animal visits a brush station. Namely, these parameters are useful when determining what is a typical animal grooming behavior.

According to another preferred embodiment of this aspect of the invention, the processing unit is also configured to process data that has been registered during a first data collection period to obtain reference data representing at least one behavioral pattern describing how the animals in a herd utilize the brush station. Then, the processing unit is configured to register data subsequent to an end of the first data collection period, and process these data to obtain check data representing the at least one behavioral pattern describing how the animals in the herd utilize the brush station, Further, the processing unit is configured to investigate whether a deviation between the check data and the reference data lies within a predefined threshold measure. If the deviation is outside of the threshold measure, the processing unit is configured to trigger an alarm signal indicating a behavioral anomaly in respect of at least one of the animals in the herd of animals.

According to a preferred embodiment of this aspect of the invention, the check data overlaps with the reference data, such that at least one data element included in the check data is also included in the reference data. This vouches for a stable decision basis, since thereby a temporary deviation from a typical behavior shortly after the period when the reference data is collected will not trigger the alarm signal. Moreover, a second data collection period during which data is registered based upon which the check data is obtained preferably has an extension in time which is essentially the same as an extension in time of the first data collection period. This approach is advantageous because it renders it relatively straightforward to define the comparison criterion for determining whether or not the above-mentioned deviation is within the threshold measure. Alternatively, the data collection period during which data is registered based upon which the check data is obtained may have an extension in time, which is substantially shorter than an extension in time of the first data collection period. This is desirable because thereby it is possible to react more quickly to any deviations from a typical grooming behavior.

According to another preferred embodiment of this aspect of the invention, the reference data and the check data include processed data representing information that pertains to two or more animals weighted together. The reference data may thus express herd behavior on a collective level, which is useful to provide support for certain types of decisions, for example regarding environmental factors (e.g. when to clean the pen, whether the ventilation is adequate and/or if the temperature level is suitable).

According to another aspect of the invention the object is achieved by the initially described method, wherein the farm environment is presumed to include a brush station having a reader unit configured to remotely register an identity of each animal visiting the brush station based on its associated identification device. The method involves registering data representing animal visits to the brush station through the reader unit, in response to the detection of a repositioning of the brush from a neutral position resulting from an animal pushing a part of itself against the brush, registering the identity data from a first detected identification device. The advantages of this method and the preferred embodiments thereof are apparent from the above discussion of the proposed system.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED EMBODIMENTS OF THE INVENTION

Figure 1:
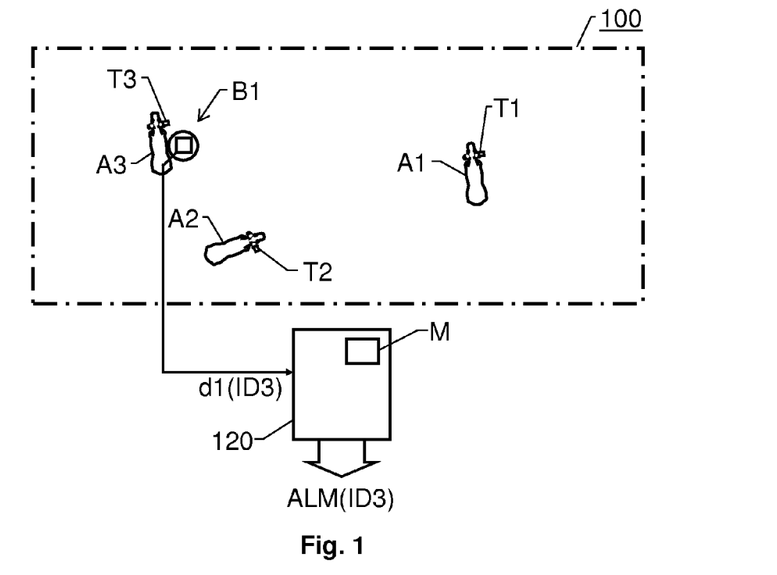
FIG. 1 schematically illustrates a farm environment in which the proposed method may be applied.
Figure 2:
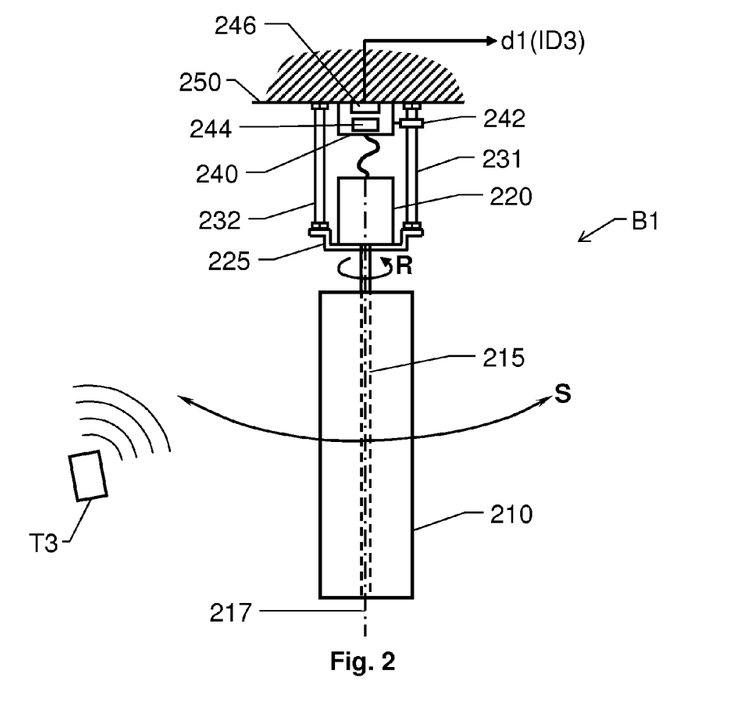
FIG. 2 shows a brush station that may be used according to embodiments of the invention.
Figure 3:
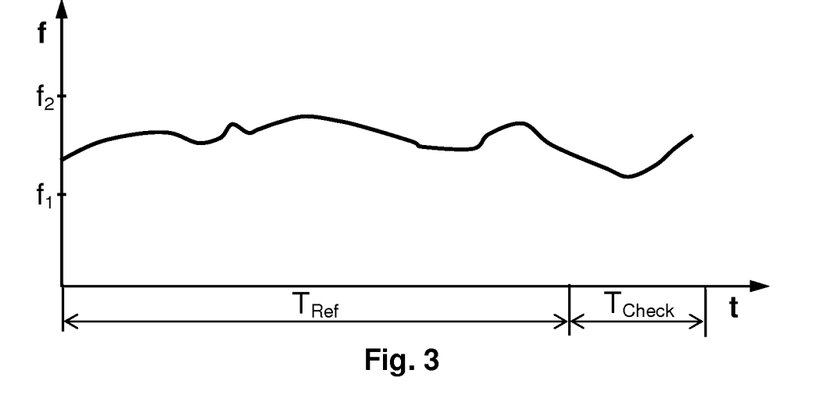
FIGS. 3-4 show graphs illustrating first and second data collection periods used according to embodiments of the invention.
Figure 4:
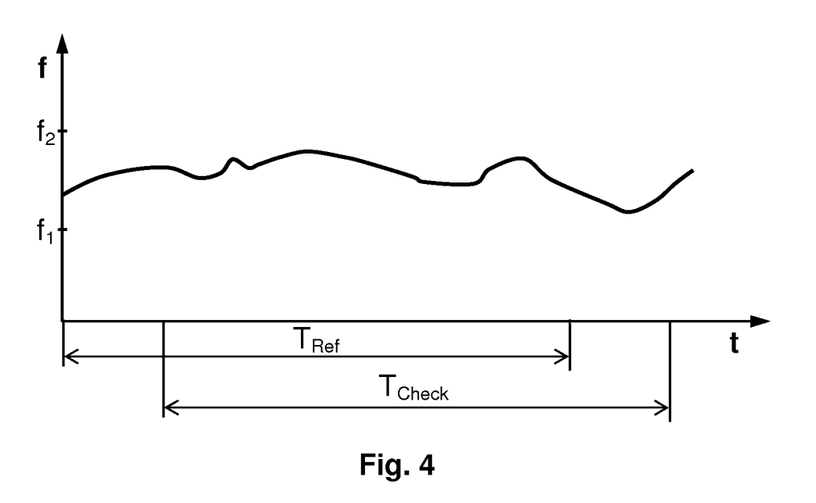

FIG. 1 schematically illustrates a farm environment 100 where the proposed automatic animal grooming system is implemented. FIG. 2 shows a detailed view of a brush station B1, which may be employed in this system, and FIGS. 3 and 4 show first and second graphs illustrating first and second data collection periods $T_{Ref}$ and $T_{Check}$ respectively according to different embodiments of the invention.

The farm environment 100, e.g. a cow pen, is presumed to accommodate a herd of animals, here symbolically illustrated by means of animals A1, A2 and A3. Each animal A1, A2 and A3 is associated with a respective identification device T1, T2 and T3 (e.g. an RFID tag or a magnetic transponder) respectively for automatic remote identifying of the animal. The term "remote" is here given a relatively wide meaning encompassing contactless registration at a distance ranging from a few centimeters up to several meters.

The farm environment 100 is further presumed to include at least one brush station B1. The brush station B1 has a reader unit 244 configured to, via the identification devices T1, T2 and T3, remotely register an identity of each animal A1, A2 respectively A3 visiting the brush station B1. Depending on the type of identification device T1, T2 and T3 used, the reader unit 244 contains suitable reading means 240, such as a radio transceiver or an inductive reader/receiver. As a complement, to enhance the identification reliability, the brush station B1 may have access to image recording and processing means configured to classify and/or identify the animals A1, A2 and A3 optically.

In any case, the brush station B1 includes a brush 210 associated with a detection means 242 configured to detect a repositioning (e.g. tilting or rotation) of the brush resulting from an animal A3 pushing a part of itself against the brush 210. For enhanced data quality, the detection means 242 may also be configured to register a magnitude of the force with which the animal pushes itself against the brush 210. The brush station B1 further includes an output interface 246, which is communicatively connected to a processing unit 120 that may either be integrated into the brush station, or be at a remote location. In response to a detected push force, the brush station B1 is configured to register the identity data ID3 from a first detected identification device T3 within the reader unit's 244 detection range, and then, via the output interface 246, forward the identity data ID3 to the processing unit 120 for processing.

Preferably, the brush 210 has an overall oblong shape, and is arranged on a shaft 215 being oriented in a general vertical direction. According to one embodiment of the invention, the brush station B1 also includes a motor 220, which is configured to rotate R the brush 210 around an axis 217, here coinciding with the shaft 215. In such a case, the brush station B1 is configured to activate the motor 220 in response to the detected repositioning of the brush 210 from the neutral position, e.g. by the brush being tilted or rotated. Once activated, it is advantageous if the motor 220 remains activated until the brush 210 is no longer repositioned from the neutral position. Namely, this is understood to be equivalent to the fact that the animal A3 that caused the activation of the motor 210 has removed itself from the brush station B1. Therefore, this point in time is preferably also interpreted as the end of the animal's visit to the brush station for the registration purposes of the processing unit 120.

Moreover, the brush 210 is pivotably attached, e.g. via one or more spring loaded elements 231 and 232, to a base structure, such as a ceiling 250 of the pen 100. The spring loaded elements 231 and 232 interconnect a rigid frame 225, onto which the motor 220 is mounted, with the base structure. The spring loaded elements 231 and 232 are configured to permit a swiveling motion S of the brush 210 relative to the base structure 250 in response to lateral push forces exerted on the brush 210. As a result, the brush 210 can reach different areas of the animals A1, A2 and A3 very efficiently.

According to the invention, data d1 are registered which represent animal visits to the brush station B1. Inter alia such data d1 are registered during a first data collection period $T_{Ref}$ and processed in a processing means 120 to obtain reference data representing at least one behavioral pattern describing how the animals A1, A2 and A3 in the herd utilize the brush station B1. Thus, the reference data may reflect a duration for each animal's A1, A2 and/or A3 visit to the brush station B1; a time of the day for each animal's A1, A2 and/or A3 visit to the brush station B1; and/or a frequency with which each animal A1, A2 and/or A3 visits the brush station B1.

The registered data d1 preferably include a start time and a stop time for each animal identity having visited the brush station B1 in the period during which the data d1 are registered. As mentioned above, the registered data d1 may also include a piece of information which for each visit at the given brush station B1 expresses the force with which each identified animal A1, A2 and A3 has groomed itself against the brush 210.

After expiry of the first data collection period $T_{Ref}$, data d1 are registered during a second data collection period $T_{check}$. These data d1 are processed by the processing means 120 to obtain check data representing the at least one behavioral pattern describing how the animals A1, A2 and A3 in the herd utilize the brush station B1.

The processing means 120 then compares the check data with the reference data and investigates whether a deviation between the check data and the reference data lies within a predefined threshold measure, for example above a first frequency $f_1$ of brush station visits and below a second frequency $f_2$ of such visits. If the deviation is outside of the threshold measure, $f_1$-$f_2$, the processing means 120 triggers an alarm signal ALM(ID3) indicating a behavioral anomaly in respect of at least one of the animals, say A3, because this animal has now visited the brush station B1 with a frequency above the second frequency $f_2$.

In addition to the above, according to one preferred embodiment of the invention, the reference data and the check data may contain processed data representing information pertaining to two or more of the animals A1, A2 and/or A3, where the data have been weighted together to express behaviors on a collective level. Thereby, it is possible to detect anomalies in the herd that are not distinctive in the behavior of an individual animal. Environmental factors related to an unclean pen, inadequate ventilation and unsuitable temperature level constitute examples of such anomalies.

The above procedure implemented by the processing means 120 is preferably controlled by a computer program M loaded into a memory of the processing means 120, or an external memory unit accessible by the processing means 120. The computer program, in turn, contains software for controlling the steps of the procedure when the program is run on the processing means 120.

Referring now specifically to FIG. 3, we see a first exemplary graph showing a frequency f as a function of time t, where the frequency f expresses how often, on average, the animals A1, A2 and A3 visit the brush station B1. As can be seen, the second data collection period $T_{check}$ follows immediately after the first data collection period $T_{Ref}$.

Preferably, during the second data collection period $T_{check}$, data are collected for each animal A1, A2 and A3, and at the end of the period, an individual average frequency value f for each animal A1, A2 and A3 respectively is derived and compared to reference data via a deviation threshold as described above.

Here, the second data collection period $T_{check}$ during which data is registered based upon which the check data is obtained has an extension in time which is substantially shorter than an extension in time of the first data collection period $T_{Ref}$. This vouches for a relatively quick response to any deviations from the norm represented by the reference data. Of course, the response becomes even quicker if the second data collection period $T_{check}$ is minimized, such that the comparison with the reference data is performed each time when a piece of data is received from the brush station B1. However, such an approach is associated with a relatively high risk of false alarms, for instance due to sound, but yet atypical animal behavior, for shorter periods of time. To determine whether or not a given visit to the brush station B1 shall be counted (i.e. if the data is to be used), the collected data is preferably double checked against functional data describing the operational status of the brush station B1 at the point in time of said visit.

To increase the reliability/stability, the check data may overlap with the reference data, such that at least one data element included in the check data is also included in the reference data. FIG. 4 shows an example of this. Here, we see a second exemplary graph showing the frequency f as a function of time t, where the frequency f expresses how often, on average, the animals A1, A2 and A3 visit the brush station B1. In contrast to FIG. 3, however, in this case the second data collection period $T_{check}$ has an extension in time which is essentially the same as the extension in time of the first data collection period $T_{Ref}$. In other words, the temporal basis for the check data is similar to that of the reference data. This, in turn, renders it relatively straightforward to compare the check data with the reference data, and determine whether or not a deviation between these data sets is within a predefined threshold value.

Preferably, irrespective of whether the second data collection period $T_{check}$ is short or long relative to the first data collection period $T_{Ref}$, the reference data is renewed repeatedly. For example, such an updating may be performed after the expiry of each second data collection period $T_{check}$. In practice, the registered data d1 may be recorded continuously/repeatedly, and different sets of historic data in these recordings are defined as reference data and check data respectively at each point in time. Thereby, it is also uncomplicated to vary the extension of the second data collection period $T_{check}$ adaptively.

Naturally, the visiting frequency f discussed above merely represents an illustrative example of reference and check data. According to the invention, numerous alternative parameters may equally well be studied, such as a duration for each animal's visit to a brush station; a time of the day for each animal's visit to a brush station; a frequency with which each animal visits a brush station and/or a force with which each identified animal has groomed itself against a brush of the brush station.

Moreover, additional data, e.g. relating to feeding frequency, the amount of food taken in and the activity level, may be useful to study in order to draw conclusions regarding the behavior of the animals.

In any case, it is preferable if the method executed in the processing means 120 includes the following steps, which are updated repeatedly:
(i) register data d1 subsequent to the end of first data collection period $T_{Ref}$;
(ii) process the data having been registered subsequent to the end of first data collection period $T_{Ref}$ to obtain check data relating to the animals A1, A2 and A3; and
(iii) investigate whether a deviation between the check data and the reference data lies within a predefined threshold measure by comparing the check data with the reference data.

If, in step (iii), the deviation is found to be outside of the threshold measure with respect to at least one animal, say A3, the method includes:
(iv) triggering an alarm signal ALM(ID3) in respect of the at least one animal A3.

Figure 5:
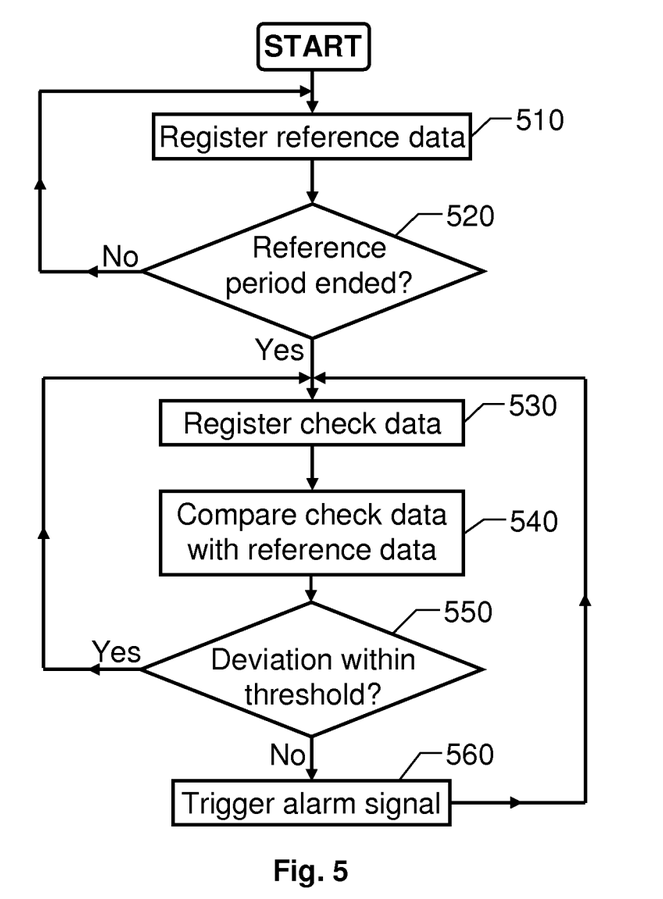
FIG. 5 illustrates, by means of a flow diagram, the general method according to the invention.

In order to sum up, and with reference to the flow diagram in FIG. 5, we will now describe the general method according to the invention for providing farm decision support relating to the individual animals in a herd of animals in a farm environment. The method presumes that: (i) each animal in the herd is associated with a respective identification device for automatic remoto identifying of the animal; and (ii) the farm environment includes at least one brush station, which each has a reader configured to remotely register an identity of each animal visiting the brush station based on the animal's identification device.

In a first step 510, based on the identification devices and the reader(s), data are registered and processed to produce reference data representing the animals' visits to the brush station(s) during a reference period. In a subsequent step 520, it is checked whether a reference period is ended, and if so, a step 530 follows. Otherwise, the procedure loops back and stays in step 510 for continued production of reference data.

In step 530, further data are registered based on the identification devices and the reader(s), and based thereon check data are produced representing the animals' visits to the brush station(s) after the end of the reference period. Thereafter, in a step 540, the check data are compared with the reference data, and a step 550 investigates whether or not a deviation between the check data and the reference data lies within a predefined threshold measure. If so, the procedure loops back to step 530 for continued production of check data.

If, however, the deviation is outside of the threshold measure, a step 560 follows, in which an alarm signal is triggered. The alarm signal indicates a behavioral anomaly in respect of at least one of the animals in the herd of animals. After step 560, the procedure preferably loops back to step 540.

All of the process steps, as well as any sub-sequence of steps, described with reference to FIG. 5 above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is advantageous in connection with cow milking, the invention is equally well adapted for implementation in milking machines for any other kind of mammals, such as goats, sheep or buffaloes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:
1. A method of providing farm decision support relating to individual animals in a herd in a farm environment, comprising the steps of:
  associating each animal (A1, A2, A3) with a respective identification device (T1, T2; T3) for automatic remote identifying of each animal;
  operating a processing device (120);
  operating a brush station (B1) having:
  i) a brush (210),
  ii) a detection unit (242) that detects a repositioning of the brush from a neutral position resulting from one of the animals (A3) pushing against the brush and registers a magnitude of a force with which the one animal pushes itself against the brush,
  iii) a reader unit (244) having a detection range and being configured to remotely register, within the detection range, identity data (ID1, ID2, ID3) of each animal visiting the brush station based on the identification device respectively associated with each animal, and
  iv) an output interface (246) operatively connected to the processing device;
  in response to the detection unit detecting the repositioning of the brush from the neutral position as a result of a first animal (A3) pushing against the brush and the magnitude of the force with which the first animal pushes itself against the brush, the reader unit registering, via a first one of the identification devices (T3) associated with the first animal, the identity data (ID3) of the first animal and the magnitude of the force with which the first animal pushes itself against the brush;

forwarding, via the output interface, the registered identity data of the first animal to the processing device and the magnitude of the force with which the first animal pushes itself against the brush; and the processing device, based on the forwarded identity data of the first animal and the magnitude of the force with which the first animal pushes itself against the brush, registering data (d1) representing a visit of the first animal to the brush station (B1) within registered data representing visits of each animal to the brush station;

further comprising the steps of the processing device:

processing the registered data having been registered during a first data collection period (TRef) to obtain reference data representing at least one behavioral pattern describing how the animals utilize the brush station;

processing the registered data obtained during a second data collection time period (TCheck) to obtain check data representing the at least one behavioral pattern describing how the animals utilize the brush station;

investigating whether a deviation between the check data and the reference data lies outside a predefined threshold measure (f1-f2); and when said deviation is outside of the threshold measure (f1-f2), triggering an alarm signal (ALW(ID3)) indicating a behavioral anomaly with respect to at least one of the animals.

2. The method of claim 1, further comprising the further step of:

subsequent to the detection unit detecting the repositioning of the brush from the neutral position resulting from the first animal pushing against the brush, and in response to the detection unit detecting a return of the brush to the neutral position, registering a stop time of the visit of the first animal to the brush station, wherein the registered data representing the visits of each animal to the brush station comprises a start time and the stop time for each visit of each animal visiting the brush station.

3. The method of claim 1, wherein the registered data representing the visits of each animal to the brush station comprises a start time and the stop time for each visit of each animal visiting the brush station, and comprising the further step of, based on the registered data, deriving at least one from the group consisting of:

a duration for each animal's visit to the brush station, a time of day for each animal's visit to the brush station, and a frequency with which each animal visits the brush station.

4. The method of claim 1, wherein the first and second data collection time periods partially overlap such that at least one data element included in the check data is also included in the reference data.

5. The method of claim 1, wherein the second data collection period (TCheck) and the first data collection period (TRef) are essentially of equal time extension.

6. The method of claim 1, wherein the second data collection period (TCheck) has a time extension substantially shorter than a time extension of the first data collection period (TRef).

7. The method of claim 1, comprising repeated updating steps of:

registering further of said data (d1) representing visits of the first animal to the brush station during a further data collection period subsequent to the end of first data collection period (TRef);

processing the further registered data (d1) to obtain further check data relating to the first animal; and investigating whether a deviation between the further check data and the reference data lies outside the predefined threshold measure (f1-f2); and when said deviation is outside of the threshold measure (f1-f2) with respect to the first animal, triggering the alarm signal (ALM(ID3)) with respect to the first animal.

8. The method of claim 1, wherein the reference data and the check data comprise processed data, representing information pertaining to two or more of the animals, having been weighted together to express herd behavior on a collective level.

9. A non-transitory computer readable medium comprising computer code loadable into memory (M) of a computer that, when executed on the computer, controls the computer to perform a method of providing farm decision support relating to individual animals in a herd the animals in a farm environment, where each animal (A1, A2, A3) is associated with a respective identification device (T1, T2; T3) for automatic remote identifying of each animal, the method comprising the steps of:

operating a brush station (B1) having:

i) a brush (210), ii) a detection unit (242) that detects a repositioning of the brush from a neutral position resulting from one of the animals (A3) of the herd pushing against the brush and registers a magnitude of a force with which the one animal pushes itself against the brush, iii) reader unit (244) configured to remotely register identity data (ID1, ID2, ID3) of each animal visiting the brush station based on the identification device respectively associated with each animal, and iv) output interface (246) operatively connected to the computer;

in response to the detection unit detecting the repositioning of the brush from the neutral position resulting from a first animal (A3) pushing against the brush, the reader unit registering, via a first one of the identification devices (T3) associated with the first animal, the identity data (ID3) of the first animal and the magnitude of the force with which the one animal pushes itself against the brush;

forwarding, via the output interface, the registered identity data of the first animal and the magnitude of the force with which the one animal pushes itself against the brush to the computer; and the computer, based on the forwarded identity data of the first animal and the magnitude of the force with which the one animal pushes itself against the brush, registering data (d1) representing a visit of the first animal to the brush station (B1) within registered data representing visits of each animal to the brush station;

further comprising the steps of the computer:

processing the registered data having been registered during a first data collection period (TRef) to obtain reference data representing at least one behavioral pattern describing how the animals utilize the brush station;

processing the registered data obtained during a second data collection time period (TCheck) to obtain check data representing the at least one behavioral pattern describing how the animals utilize the brush station;

investigating whether a deviation between the check data and the reference data lies outside a predefined threshold measure (f1-f2); and when said deviation is outside of the threshold measure (f1-f2), triggering an alarm signal (ALM(ID3)) indicating a behavioral anomaly with respect to at least one of the animals.

10. A system for providing farm decision support relating to individual animals in a herd in a farm environment, the system comprising:

an identification device (T1, T2; T3) associated with each respective animal (A1, A2, A3) in the herd, each identification device respectively providing for automatic remote identifying of each associated animal;

a brush station (B1) having:

i) a brush (210), ii) a detection unit (242) configured to detect a repositioning of the brush from a neutral position resulting from one of the animals (A3) pushing against the brush and to register a magnitude of a force with which the one animal pushes itself against the brush, iii) a reader unit (244) having a detection range and being configured to remotely register, within the detection range, identity data (ID1, ID2, ID3) of each animal visiting the brush station based on the identification device respectively associated with each animal and the magnitude of the force with which each animal pushes itself against the brush, and iv) an output interface (246); and a processing device (120) that registers data representing visits of each animal to the brush station;

wherein, in response to the detection unit detecting the repositioning of the brush from the neutral position resulting from a first animal (A3) pushing against the brush, i) the reader unit registers, via a first one of the identification devices (T3) associated with the first animal, the identity data (ID3) of the first animal and the magnitude of the force with which the first animal pushes itself against the brush, ii) via the output interface, the registered identity data of the first animal is forwarded to the processing device, and iii) the processing device, based on the forwarded identity data of the first animal and the magnitude of the force with which the first animal pushes itself against the brush, registers data (d1) representing a visit of the first animal to the brush station (B1) within the registered data representing the visits of each animal to the brush station, wherein the processing device (120) is further configured to:

process data (d1) which has been registered during a first data collection period (TRef) to obtain reference data representing at least one behavioral pattern describing how the animals (A1, A2, A3) in the herd utilize the brush station (B1);

register further data (d1) subsequent to an end of the first data collection period (TRef), and process the further data to obtain check data representing the at least one behavioral pattern describing how the animals (A1, A2, A3) in the herd utilize the brush station (B1);

investigate whether a deviation between the check data and the reference data lies outside a predefined threshold measure (f1-f2); and when said deviation is outside of the threshold measure (f1-f2), trigger an alarm signal (ALM(ID3)) indicating a behavioral anomaly with respect to at least one of the animals (A3).

11. The system of claim 10, wherein the brush (210) is pivotably attached (231, 232) to a base structure (250) configured to permit a swiveling motion (S) of the brush (210) relative to the base structure (250) in response to push forces exerted on the brush (210).

12. The system of claim 10, wherein the brush station (B1) further comprises a motor (220) configured to rotate (R) the brush (210) around an axis (217), and the brush station (B1) is configured to activate the motor (220) in response to the detected repositioning of the brush (210).

13. The system of claim 10, wherein, the detection unit (242) is further configured to detect a return of the brush (210) to the neutral position, and the brush station (B1) is further configured to, in response to a detected return of the brush (210) to the neutral position, register a stop time so that the registered data (d1) comprises start and stop times for each animal (A1, A2, A3) identity having visited the brush station in a period during which the data (d1) is registered.

14. The system of claim 13, wherein the processing device (120) is further configured to, based on the registered data (d1), derive at least one of the group consisting of:

a duration for each animal's (A1, A2, A3) visit to the brush station (B1), a time of the day for each animal's (A1, A2, A3) visit to the brush station (B1), and a frequency with which each animal (A1, A2, A3) visits the brush station (B1).

15. The automatic animal grooming system according to claim 10, wherein the check data overlaps with the reference data such that at least one data element included in the check data is also included in the reference data.

* * * * *